UNITED STATES PATENT OFFICE.

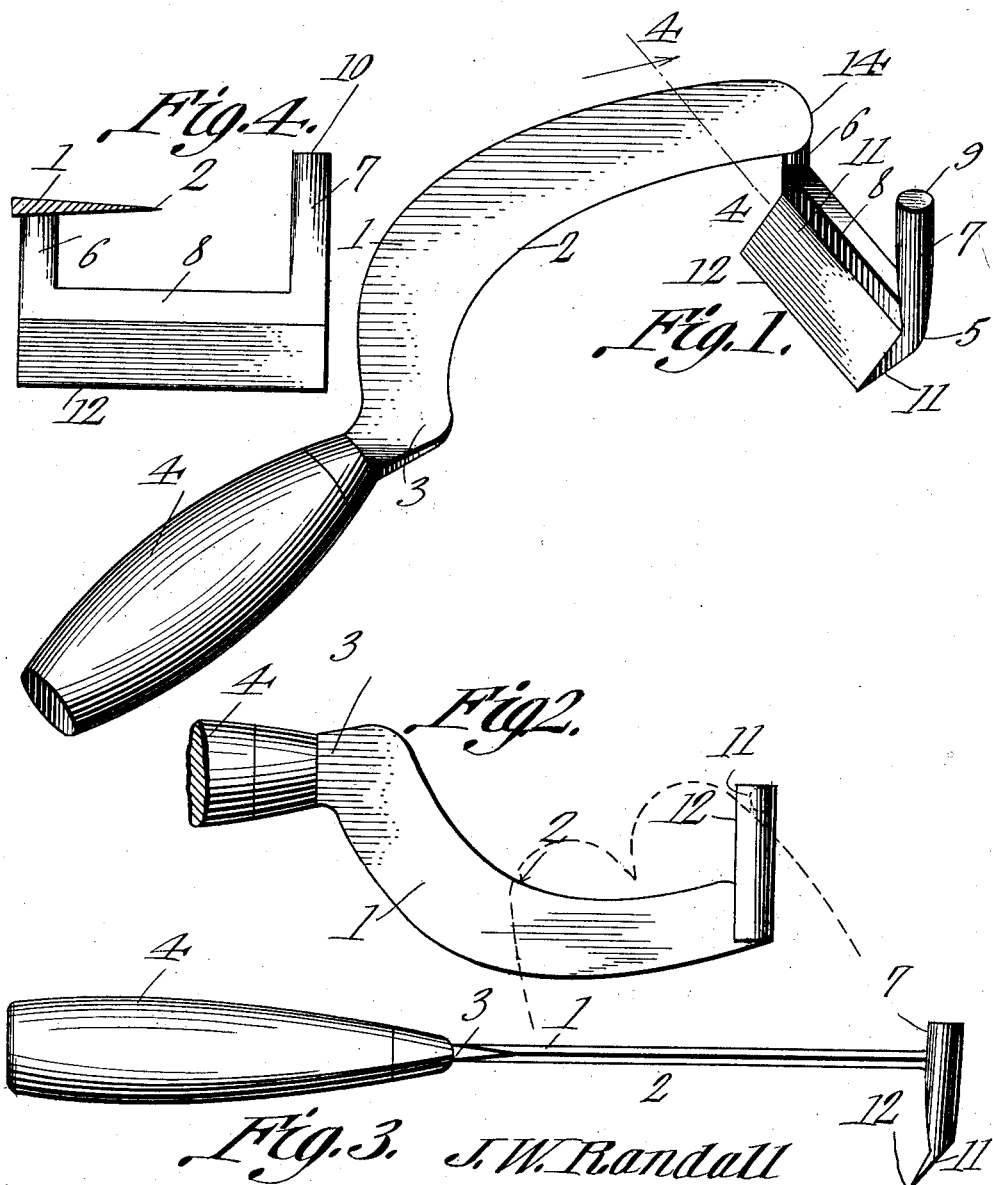

JOHN W. RANDALL, OF HALIFAX, NORTH CAROLINA, ASSIGNOR TO WILLIAM H. TILLEY, OF HALIFAX, NORTH CAROLINA.

FARRIER'S KNIFE.

1,057,090. Specification of Letters Patent. Patented Mar. 25, 1913.

Application filed August 28, 1912. Serial No. 717,641.

*To all whom it may concern:*

Be it known that I, JOHN W. RANDALL, a citizen of the United States, residing at Halifax, in the county of Halifax and State of North Carolina, have invented a new and useful Farrier's Knife, of which the following is a specification.

The device forming the subject-matter of this application is a farrier's knife so constructed that the operation of paring the hoof of an animal may be carried on at a minimum effort.

The invention aims to provide a farrier's knife in which the free end of the blade may be given a swinging movement, to produce a draw cut.

Another object of the invention is to provide a farrier's knife, the blade of which may be tilted transversely, to permit the blade to pass out of the hoof, without breaking the engagement between the hoof-engaging guide and the hoof.

A further object of the invention is to provide a farrier's knife which may be employed to pare the face of the hoof and to pare the frog or the interior of the hoof.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a perspective; Fig. 2 is a plan; Fig. 3 is a side elevation; and Fig. 4 is a section on the line 4—4 of Fig. 1.

In carrying out the invention there is provided a curved member 1 having a concaved cutting edge 2 and provided at one end with a tang 3, which is received within a handle 4. An arched member, denoted generally by the numeral 5, projects from the free end of the member 1, at right angles thereto, the arched member 5 comprising a bar 6 which is formed integrally with the free end of the member 1, a hoof-engaging guide 7 which is parallel to the bar 6, and a rectangularly disposed bar 8 which connects the guide 7 with the bar 6. As indicated at 9 in Fig. 1, the guide 7 is of circular cross section, and as shown at 10 in Fig. 4, the guide 7 projects beyond the plane of the curved member or blade 1. The edge of the bar 8 is inclined to overhang the blade 1, as indicated at 11, the portion 11 terminating in a sharpened edge 12.

In practical operation, the guide 7 is engaged with the hoof, adjacent the frog, as indicated in Fig. 2. A rocking motion is imparted to the blade 1, with the guide 7 as a fulcrum, and at the same time, the knife is drawn around the hoof, the guide 7 traversing the periphery of the hoof. The cutting edge 12 may be employed for trimming the frog, or for trimming the inside of the hoof. Owing to the fact that, as indicated at 9, the guide 7 is of circular cross section, the guide will rock readily upon the periphery of the hoof, and at the same time the guide will slide around the periphery of the hoof, during the rocking operation. The circular cross section of the guide 7, therefore, renders it possible to rock or swing the blade 1, and at the same time to draw the blade around the periphery of the hoof. Owing to the fact that the bar 8 is interposed between the guide 7 and the bar 6, the guide 7 is located at some considerable distance from the free end of the cutting edge 2. It is therefore possible to give a swinging movement to the blade 2, with the guide 7 as a center, and this swinging movement takes place throughout the entire length of the cutting edge 2, the free extremity of the cutting edge 2 having a swinging movement in an arc, the radius of which is represented by the length of the bar 8. The tip of the edge 2 is therefore given a swinging, draw cut.

There is a distinct advantage in providing the arched member 5, instead of permitting the guide 7 to project directly from the blade 1. Owing to the fact that the arched member 5 is provided, the blade 1 may be tilted at the end of the cut, to permit the edge 2 to ride out of the hoof, without withdrawing the guide 7 from its engagement with the periphery of the hoof, it being obvious that if the guide 7 were secured directly to the blade 2, the same operation which permitted the edge 2 to ride out of the hoof upon a diagonal line, would serve also to withdraw the guide 7 from its bearing upon the periphery of the hoof. Since the crown of the arched member 5 is laterally inclined, as indicated at 11, the arched member is reinforced and strengthened, so that it will withstand the pull which is imposed upon the guide 7. The guide 7 has a function when the cutting edge 12 is used. When the cutting edge 12 is used to trim the frog, the guide 7 will ride along the interior of the hoof, and when the edge 12 is used to pare away the interior of the hoof, the guide 7 will ride along the base of the hoof, the circular contour of the guide 7 making it peculiarly efficient under either of the circumstances last above set forth.

It is to be noted that, as indicated at 14, the cutting edge 2 is rounded to a point adjacent the bar 6. Consequently, there will be no splintering of the hoof at the extremity of the edge 2.

Having thus described the invention, what is claimed is:—

1. A farrier's knife comprising a blade, an arched member disposed at right angles to the plane of the blade, one end of the arched member being secured to the blade and the other end of the arched member extending across the plane of the blade, the cutting edge of the blade being prolonged between the ends of the arched member.

2. A farrier's knife having at its free end, a projecting member arched away from the plane of the blade and disposed at an angle to the plane of the blade and terminating in a hoof-engaging guide extended across the plane of the blade.

3. A farrier's knife having at its free end, a projecting, arched member disposed at an angle to the blade and terminated in a hoof-engaging guide extended transversely of the plane of the blade, the crown of the arched member being inclined to reinforce the arched member.

In testimony that I claim the foregoing as my own, I have hereto affixed my signature in the presence of two witnesses.

JOHN W. RANDALL.

Witnessses:
E. B. Hussey,
Ira G. Shaw.

---

Copies of this patent may be obtained for five cents each, by addressing the "Commissioner of Patents, Washington, D. C."